Figure 1:
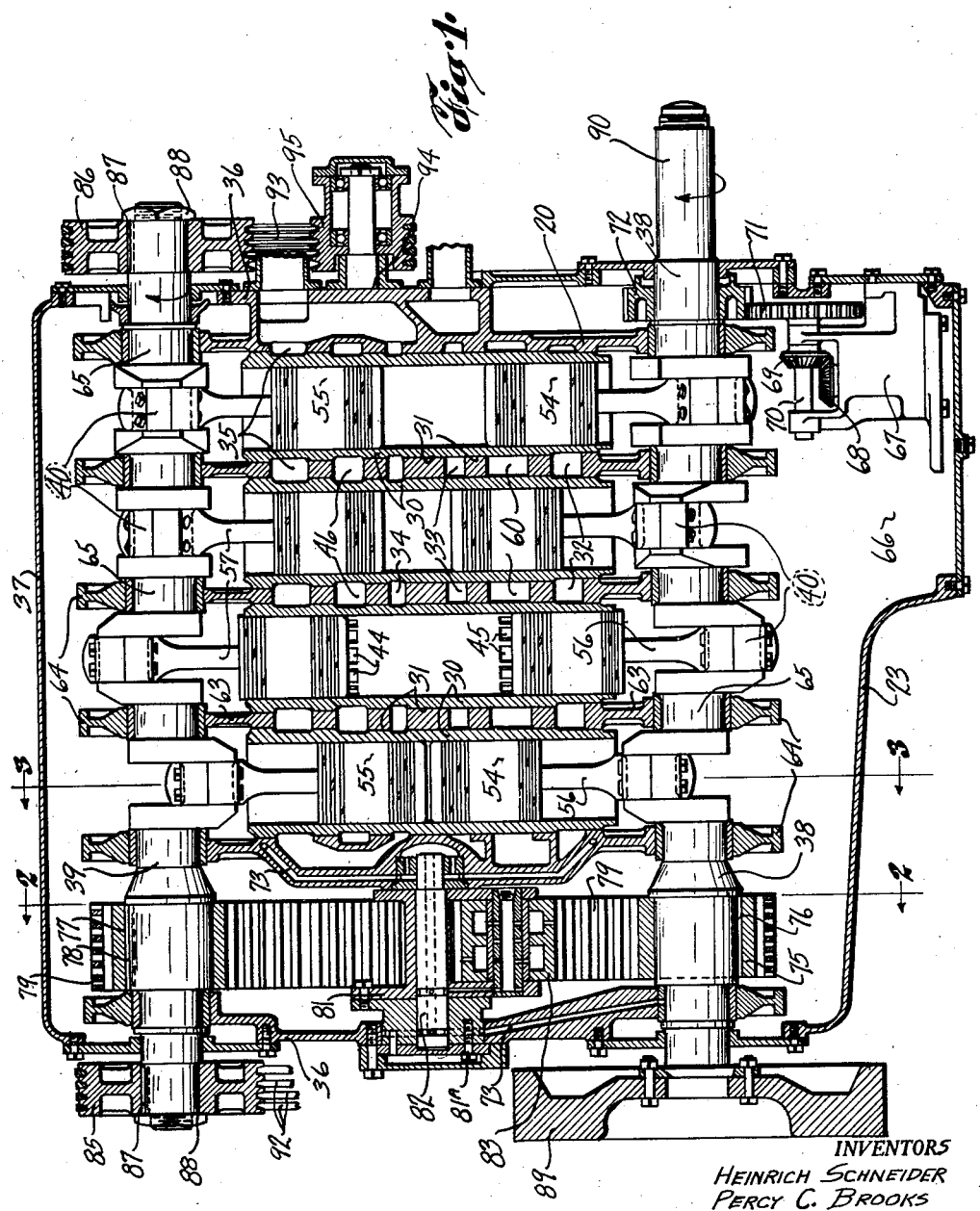

Sept. 15, 1936.          H. SCHNEIDER ET AL          2,054,232
                    ENGINE OF OPPOSED PISTON TYPE
                    Filed Sept. 14, 1933     5 Sheets—Sheet 3

*Fig. 3.*

INVENTORS
HEINRICH SCHNEIDER
PERCY C. BROOKS
BY
*Ray M. Eilers*
ATTORNEY

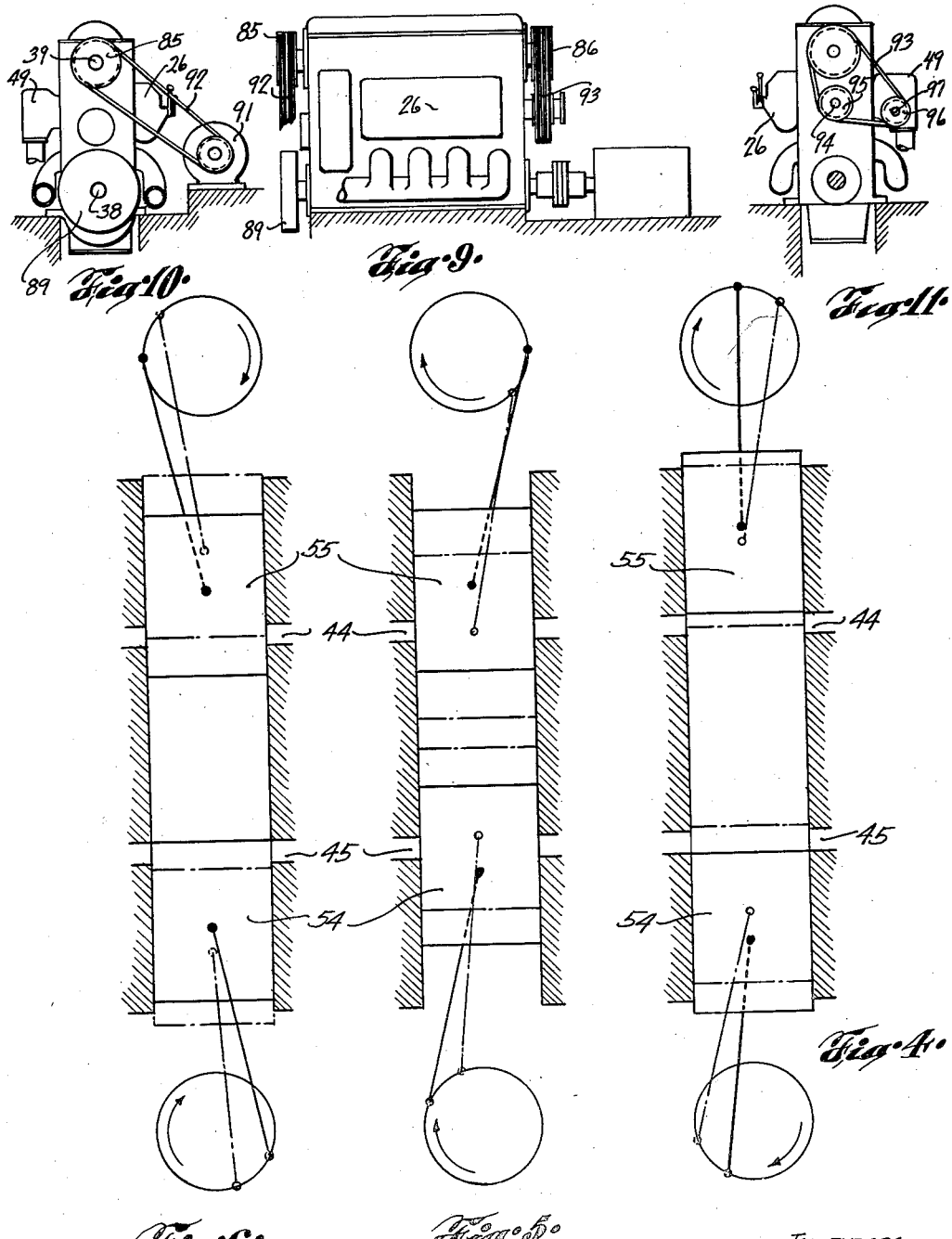

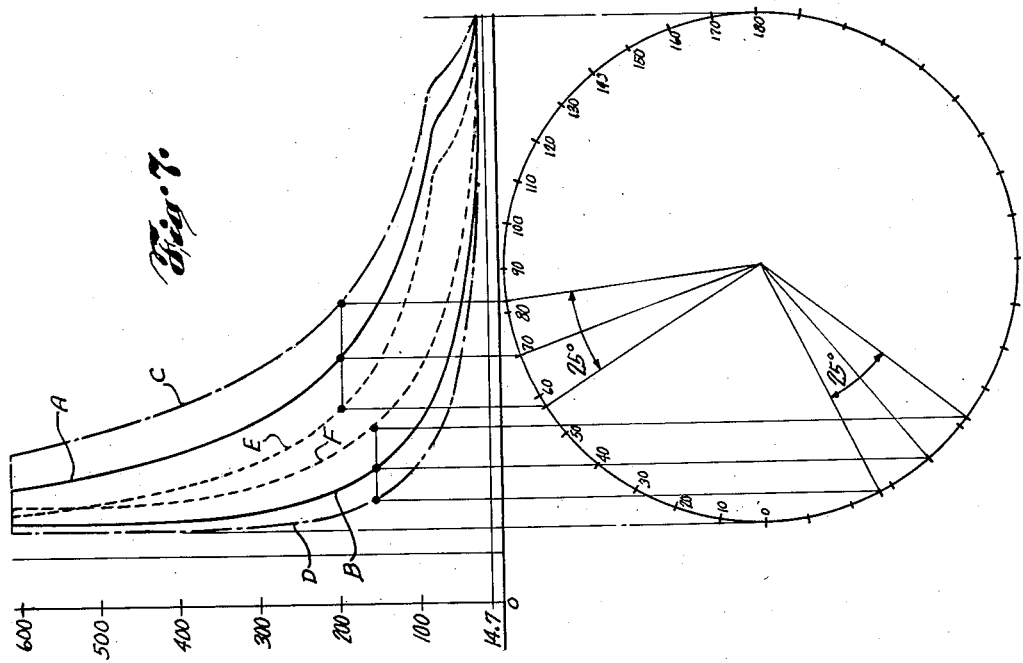
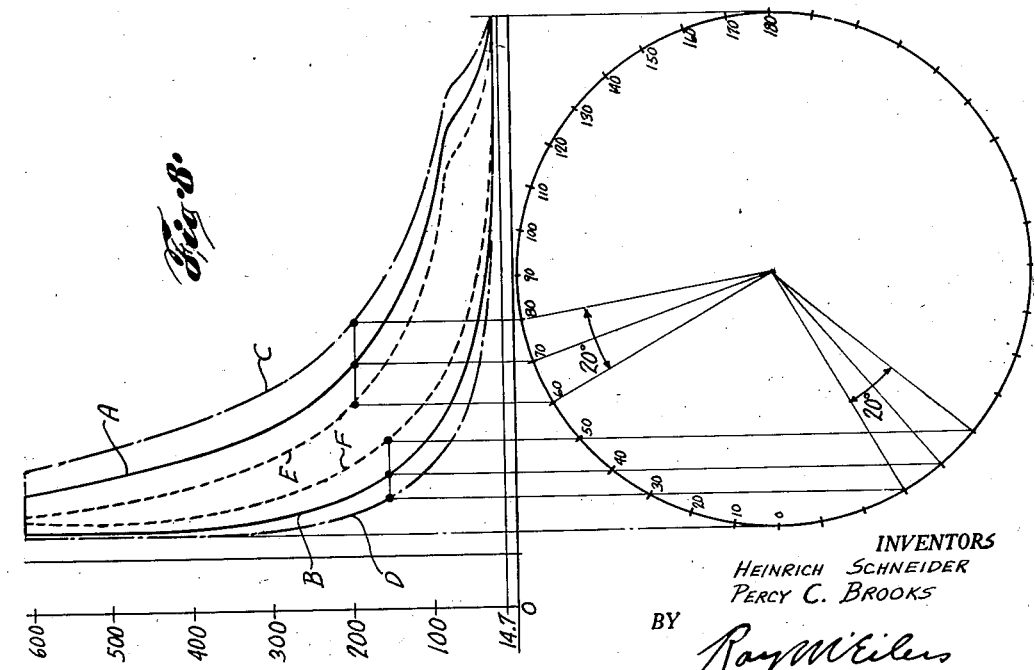

Patented Sept. 15, 1936

2,054,232

UNITED STATES PATENT OFFICE 2,054,232

ENGINE OF OPPOSED PISTON TYPE

Heinrich Schneider, Beloit, Wis., and Percy C. Brooks, Chicago, Ill., assignors to Fairbanks, Morse & Company, Chicago, Ill., a corporation of Illinois Application September 14, 1933, Serial No. 689,370

16 Claims. (Cl. 123—51)

This invention relates to improvements in engines of opposed piston type, and more particularly to those engines of the two stroke-cycle type characterized by paired oppositely moving pistons operable in a common cylinder or combustion space.

A general object of the present invention consists in the improvement in design of several interrelated features of opposed piston engines, and are particularly applicable to Diesel engines of this type. In certain of the heretofore prevailing engines of opposed piston type, the paired pistons are relatively angularly displaced from a 180 degree setting, with the result that one of the pistons occupies a position relatively advanced in its cycle with respect to the other piston. It is known so to construct an engine of this order so that the leading piston controls the exhaust ports of the combustion space common to both of the pistons. This arrangement results in an advantage, in that the exhaust ports are opened prior to the opening of the inlet or scavenging ports, permitting a portion of the exhaust gases to escape and causing a substantial drop in cylinder pressure before the air ports are uncovered by the trailing piston. The arrangement further results in closing the exhaust ports prior to the time of closing the air inlet ports, resulting in a substantially augmented volume of charging air, resulting in a supercharging effect.

Another object of the invention is attained, in combination with the piston arrangement above noted, of a plurality of crank shafts operatively connected in timed relation, by perference through a drive chain, together with the provision of means for maintaining the tension of the chain in such a manner that the timed relation of the crank shafts remains substantially constant irrespective of the extent of take-up.

Yet another object of the invention is attained in an engine of the type noted, employing paired operatively connected crank shafts, together with means for connecting the crank shafts, and an aggroupment of engine driven adjuncts so distributed with respect to the crank shafts that the connection therebetween is relieved of all but a minimum part of the engine load, thus enabling a lighter drive connection to be employed for maintaining the shafts in operatively timed relation, and maintaining a more quietly operating chain or gear arrangement.

A still further object of the invention is attained in a novel chain-tensioning device adjustably positioned with respect to a timing chain of an engine of the present type, that the chain may be tightened or loosened independently of the timed relation of the crank shafts or other engine shafts operatively associated through the chain.

Yet another object of the invention is attained in an opposed piston engine of the general type heretofore referred to, including two crank shafts, a power connection therebetween, such as the chain of the present disclosure, together with engine driven accessories or adjuncts for the power plant, and which are so grouped or distributed with respect to the two crank shafts, that they are driven independently of the chain, or like connection, between the crank shafts. In a system such as that of the present disclosure, this distribution of driven engine adjuncts is, or may be, so effected that one of the crank shafts, preferably the one connected to the trailing piston or pistons, and delivering a considerably lesser portion of the total engine power, may have its energy more or less completely absorbed by the engine adjuncts or other minor engine-driven mechanism, and so serve to minimize that portion of the total load necessary to be transmitted through a timing chain or gearing, from one crank shaft to the other.

A further and more general object may be noted as consisting in the provision of a sturdy and dependable prime mover of Diesel type, characterized by a minimum number of parts, and improved dependability and efficiency.

Figure 2:
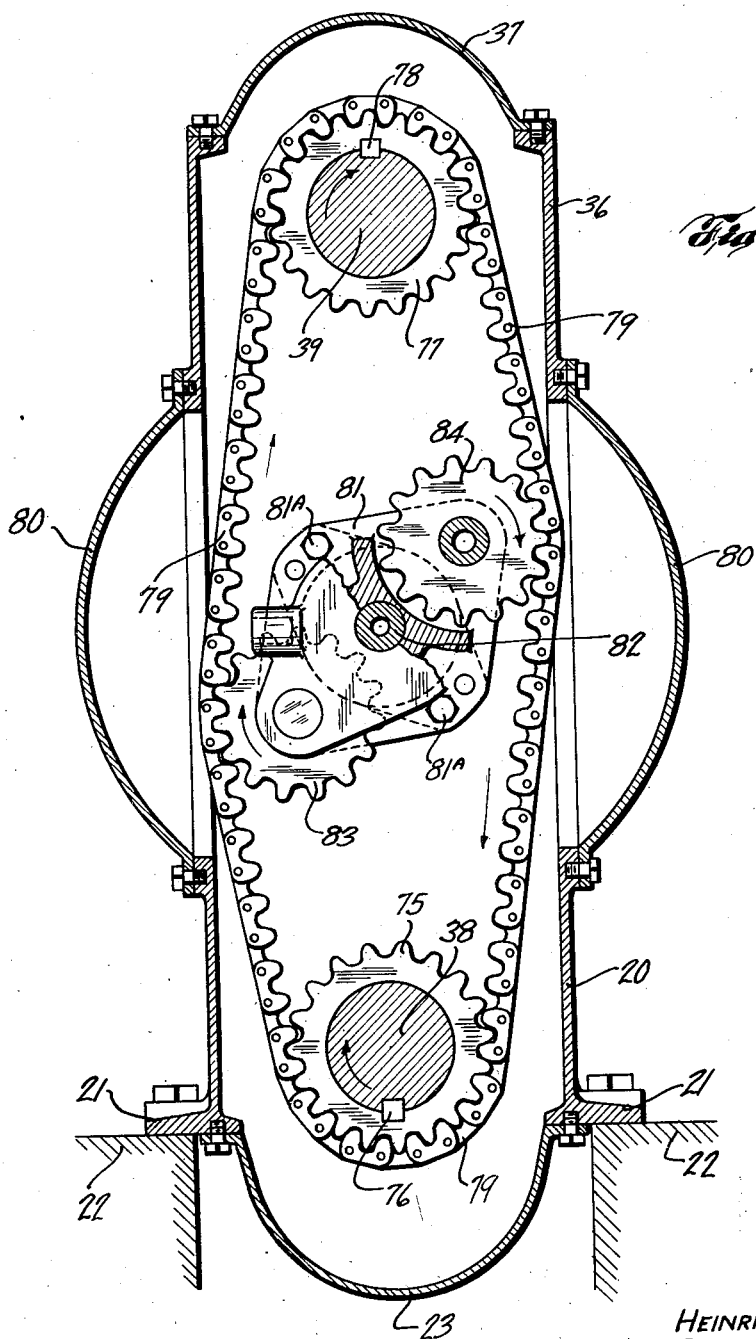

Further objects and advantages will appear from the following detailed description of an engine embodying the invention in present preferred form, the description being considered in connection with the accompanying drawings, in which:

Fig. 1 is a vertical sectional elevation of an engine assembly of four cylinder, two-cycle Diesel type; Fig. 2 is a vertical sectional elevation as viewed along line 2—2 of Fig. 1; Fig. 3 is a similar view taken along line 3—3 of Fig. 1; Figs. 4, 5, and 6 are diagrammatic representations illustrating the piston positions in three different parts of the cycle; Figs. 7 and 8 are each graphic diagrammatical representations showing pressure-volume curves and related crank angle diagrams so as to present such crank angle diagrams in juxtaposition with the usual indicator card diagrams; Fig. 9 is a side elevation of a power plant embodying, on a reduced scale, the engine of Fig. 1; and Figs. 10 and 11 are front and rear end elevations respectively of the engine of Fig. 9. For convenience of representation, the views described illustrate the invention as embodied in a vertical assembly; it will be understood, however, that the engine may also be positioned in a vertical structure in a position which is inverted with respect to the present structure, or further that it is equally practical with or without minor modifications, with a vertical structure in which the axes of the pistons or crank shaft are substantially parallel to the horizontal plane.

Referring now to the drawings pressure oiling is provided through the agency of oil tubes or ducts, which may be arranged in conventional manner, the crank shafts 38 and 39 being drilled, and the passages thereof provided with inlet and discharge openings arranged to register with the duct system of the engine. Those of the oil ducts appearing in Figs. 1 and 3 are indicated generally by the numeral 73. These ducts include a return system by which all oil in excess of actual requirements is returned to the lower case portion, and hence to the sump 66 for recirculation.

Operative interconnection of the crank shafts 38 and 39 is provided for by the assembly best shown in Fig. 2, and consisting preferably of a sprocket 75, secured as by a key 76 to the shaft 38, a companion sprocket 77 being similarly keyed as at 78 to the crank shaft 39. The sprockets 75 and 77 are similar as to diameter and number of teeth so as to operate at the same speed. These sprockets are interconnected in timed relation through a chain 79, preferably of the so-called silent type. That portion of the frame about the chain 79 and sprockets, is provided with removable lateral cover portions 80 in the form of hollow caps, whereby the upwardly and downwardly moving passes of the chain are permitted to diverge as shown by Fig. 2.

Arranged internally of chain 79 is an idler assembly, consisting, as shown, of a rocker 81 pivoted as at 82, to a stationary member (not shown) of the frame. Bracket 81 serves to carry at its opposite ends, a pair of idler sprockets, one of which, shown at 83, engages the upward moving portion of the chain, and the other, indicated at 84, engages the downward moving pass of the chain. The bracket 81 may be adjustably positioned, for purposes of varying the chain tension, through the agency of screws 81A. These screws engage for example, arcuate slots (not shown) in the adjacent frame member. It is to be noted, however, that such slots and screws may be dispensed with, and that the bracket 81 may be permitted floatingly to move about its pivot 82 between the passes of the chains. Under these conditions, the arrangement is such that, as the engine is started, the upward travel of one pass of the chain tends to swing the bracket in a direction to deflect the opposite side of the chain to an equal extent, and hence the chain will be, at all times, tensioned to an extent to maintain it taut, and to keep the shafts 38 and 39 in timed relation. This timed relation will not me disturbed by any possible change in setting of the bracket 81.

Our preference in timing the crank shafts 38 and 39 through the chain 79, is to displace, angularly, the corresponding crank throws from a 180 degree relation, so that one of the paired pistons, being the lower or exhaust-port-controlling piston of the present example, leads its companion piston a distance corresponding to a crank angle say of 20 or 25 degrees. This out-of-phase relation will best appear from the diagrams of Figs. 4, 5, and 6, illustrating the relative piston positions in any given cylinder at different stages of the cycle. Fig. 4 may be considered as taken at substantially the end of the working stroke, the exhaust ports having been fully opened by the exhaust piston, and the air ports opened for the introduction of scavenging air. Fig. 5 shows both pistons advancing during the compression stroke, and after both the air and exhaust ports have been fully closed. Each piston is now approaching its inner center position. Fig. 6 illustrates the condition prevailing just prior to the opening of the exhaust ports by the exhaust piston, and prior to the time when the scavenging piston has started to open the air ports. Each of Figs. 4, 5, and 6 illustrates the corresponding crank, connecting rod and piston positions of each cylinder in full lines, and for purposes of comparison, includes a showing in dotted lines wherein the two cranks have each advanced through an angle of 45 degrees, thereby showing the effect of this additional movement of each piston at positions near the beginning and end of its stroke. The diagrams of Figs. 4, 5, and 6 assume an angular lead of the exhaust piston of 25 degrees. In Fig. 4, when the pistons are positioned as shown in full lines, the working stroke has been completed, and both the air and exhaust ports are opened so that scavenging has been substantially completed. Fig. 6 shows the spacing of the pistons relative to each other, and to the air and exhaust ports, before the ends of the strokes, according to the full lines. It will be seen that the exhaust piston is here ready to initiate the opening of the exhaust ports, and that such opening will take place considerably prior to the time when the air is admitted by movement of the scavenging piston. Thus the exhaust gases, being under positive pressure, are permitted to escape through the exhaust ports and into the exhaust manifold, so as substantially to restore the combustion space to atmospheric pressure prior to the admission of any scavenging air. Referring back to Fig. 4, it will appear from a comparison of the piston and crank positions in dotted lines, that the exhaust ports will be completely closed by the exhaust piston substantially prior to closing of the air ports by the scavenging piston. The continued entrance, during the time the pistons are so related, of additional scavenging air from the receiver, results in building up a substantial positive air pressure in the cylinder prior to any appreciable compression, and thus operates to produce a supercharging effect.

A comparison of the full line piston positions in Fig. 5, as they would appear during the compression stroke, will reveal the different spacing of the exhaust and scavenging pistons from the transverse midplane of the cylinder. This difference, due to the lead of the exhaust piston, is accentuated in a comparison of the dotted line, with the solid line piston and crank positions of Fig. 5.

It may be pointed out that the diagrams of Figs. 4, 5, and 6, in a four-cylinder engine, such as shown by Fig. 1, will also provide, for comparison, a showing of the relative positions of the pistons in different cylinders, for example the drawings will show as by the parts shown in full lines, the relation of the pistons in number 2, 3, and 4 cylinders, in the order of the figures.

A graphic translation of the results attained in operation, according to Figs. 4, 5, and 6, is shown by Figs. 7 and 8, wherein the lower parts of each diagram are marked to show different crank angles, in degrees, the upper part of each diagram being in the nature of a coordinate graph in which absolute pressures are plotted against piston stroke or travel which, as the diagrams show, is coordinated with the angular travel of the associated cranks. Since Figs. 7 and 8 are identical in their derivation, and vary only by reason of the fact that in the former case, the lead of the exhaust piston is 25 degrees from a 180 degree displacement, while according to Fig. 8 this lead is 20 degrees, a description of one of these figures will suffice for both. In Fig. 7 the full lines A and B represent an indicator card under conditions in which neither piston leads the other, or otherwise expressed, the pistons operate in phase, the companion cranks being set at 180 degrees. The different points on the curve correspond to the successive angular positions shown on the adjacent circle. When the two crank shafts are angularly so displaced that the exhaust piston leads the scavenging piston, there results a card represented by the two dot and dash lines C and D, representing the effective pressure on the exhaust piston. The substantial divergence of lines C and D reveals that the mean effective pressure on this piston not only is substantially greater, but a substantial driving pressure endures for a longer time during a given complete cycle than is true of either piston, when no lead is provided. When the exhaust piston leads the scavenging piston by 25 degrees according to Fig. 7, a diagram representing the cylinder pressure on the scavenging piston is represented by the dotted lines E and F. It will be observed from a comparison of the area between lines C and D, with the area between lines E and F, that the energy imparted to the exhaust piston, and consequently the energy available through the exhaust crank shaft such as 38 of the present example, is several times greater than that available through the scavenging crank shaft such as 39 of the present example. A corresponding condition prevails when the exhaust piston lead is 20 degrees rather than 25 degrees, but the proportionate output of the two crank shafts presents a lesser differential than is the case when the exhaust crank leads by 25 degrees. Corresponding reference letters bearing prime suffixes are employed to designate the corresponding curves of Fig. 8. To exemplify specific results attained under normal load with an exhaust crank lead of 25 degrees, according to Fig. 7, a comparison of the areas of the scavenging piston card and the exhaust piston card shows a mean indicated pressure on the scavenging piston amounting, in round figures, to 18% of the total, while the M. I. P. on the exhaust piston accounts for 82% of the total. According to the diagram of Fig. 8, where a 20 degree exhaust piston lead prevails, the M. I. P. on the scavenging piston represents approximately 25.7%, and that on the exhaust piston 74.3% of the total.

In engines of the present type there is practically always a necessity for driving a plurality of engine adjuncts, such as a cam shaft for the actuation of the injection and fuel pumps, a pump for the circulation of cooling water, a blower or compressor for the creation of scavenging air pressure, and in many instances, some equipment auxiliary to the principal engine-driven apparatus such as an exciter employed in connection with dynamo electric machines. Considered either individually or collectively, as to their power requirements, such adjuncts consume a substantial, although minor proportion of the total engine torque or power. Since an engine of opposed piston type constructed according to the present principles, and embodying a pair of crank shafts, imparts a relatively lesser proportion of its power to what may be termed the scavenging crank shaft, we have found it most desirable to utilize the power delivered by the scavenging crank shaft, for driving the several engine adjuncts and other ancillary driven mechanism. If the power requirements of such engine adjuncts account for a proportion of total engine power in excess of that available from the scavenging crank shaft, it is then preferred to connect only such of the adjuncts to this shaft, as will substantially consume its power.

A distinct purpose and advantage results from this arrangement, in that it enables, first, a minimization in the size of the chain and sprockets or any other gearing arrangement serving to connect the two crank shafts; secondly, among other advantages, this crank shaft connecting drive is not subjected to the stresses otherwise prevailing were a substantial proportion of the engine power normally transmitted therethrough. The described arrangement thus permits the use of a much smaller chain or smaller gearing than would otherwise be necessary. A further advantage results in that this drive, whatever its form or type, operates much more quietly and with less consumption of lubricant than would be the case if the arrangement were normally required to carry a more substantial part of the total engine load.

It will be noted that this feature of design is not available in any engine of opposed piston type in which the paired pistons are directly operatively connected to a common crank shaft, nor are the present advantages afforded by an arrangement in which the two pistons are connected through yokes or the like, in the absence of independent power takeoff pulleys or gears for the engine accessories or adjuncts.

In the present disclosure, the cam shaft (not shown) by means of which the fuel- and injection-pumps or injectors may be operated, is preferably driven by a chain or gears, (not shown) from crank shaft 39, being the scavenging crank shaft of the exemplifying disclosure. Shaft 39 is provided, preferably at each of its opposite ends and exteriorly of the frame, with power takeoff elements which may consist of gears or sprockets, but which are shown as power pulleys 85 and 86. These pulleys are of a type adapted for a multiple V belt drive, and are directly secured to the opposite free ends of the crank shaft as by keys 87 and nuts 88. The exhaust crank shaft likewise is shown as projecting from both ends of the frame, serving at one end to carry a flywheel 89 and provided with a power takeoff extension 90 at its opposite end, the extension 90, by preference, serving as the principal power takeoff from the engine. This takeoff may be utilized with a flexible coupling or other form of connection for driving an alternator, compressor, variable speed gear, the propeller shaft of a vehicle, or for any of the other usual power purposes. As illustrated in Fig. 10, the pulley 85 may be employed to drive an exciter 91 when the engine is connected to an electrical load, transmission of power to the exciter being effected by multiple V belt 92, or some equivalent thereof. The opposite end of the engine, as illustrated in Fig. 11, utilizes the pulley 86, through a multiple V belt 93, for the purpose of driving a circulating pump 94 through the agency of a pulley 95. The same belt 93, powered from pulley 86 and crank shaft 39, may conveniently be employed to engage a blower pulley 96 carried by a shaft 97 connected to one or both of the impellers 50, in case the blower utilized is of the type illustrated by Fig. 3.

The foregoing selection of adjuncts powered from the scavenging crank shaft, has been found to provide an arrangement according to which the non-useful portion of the engine power is derived from the scavenging crank shaft, with the result that the drive chain connecting the shafts, serves primarily as an agency for keeping the shafts 38 and 39 in timed relation to each other, it being observed that the pulleys 85 and 86, as well as the cam shaft drive, (not shown) are connected to the crank shaft 39 independently of the chain and sprockets. The chain accordingly, in the present example, merely floats across the shafts, operating quietly under very little stress, since the power of the engine available to be taken off for major power requirements is transmitted directly from the several exhaust pistons to the crank shaft 38 and extension 90.

In the showing of Fig. 3, the axis and nozzle of the injector body 25 lie substantially in a transverse midplane of the cylinder. An examination of this figure will reveal that the nearest margins of exhaust ports 45 are disposed somewhat more closely to this midplane, than are the nearest margins of the scavenging air ports 44. Due to the lead of the exhaust piston, and due to the dissimilarity of spacing of the two port bands, it will appear that this spacing accounts in part, for the difference in duration of the effective working strokes of the two pistons. This effect may, depending upon desired characteristics, be carried somewhat further or otherwise varied from the present design. What may be termed an effective lead of one piston over the other may be obtained or enhanced by other changes in design; for example, the axes of either or both of the crank shafts 38 and 39 may be laterally offset from the produced cylinder axis, or the axes of the two ends of each cylinder may be disposed somewhat out of alignment, or offset from each other with the effect of contributing to an effective lead. The features last discussed are not illustrated, and the extent, if any, of their embodiment may be arrived at according to the extent of angular crank lead provided by the structure of the disclosure.

Experience has shown that the present engine, besides being of sturdy and dependable construction and embodying but relatively few parts, is characterized by a high degree of efficiency, is economical in fuel consumption, and in other respects fully attains each of the several objects above appearing.

Our engine has been described by making specific and particular reference to a presently preferred embodiment. It will be understood, however, that numerous changes may be made in the parts, and in their combinations, and that certain parts may be omitted and others substituted, all without departing from the spirit and full intended scope of the invention, defined by the appended claims.

We claim as our invention:

1. In a Diesel of opposed piston type, a pair of pistons operatively interconnected in timed relation and arranged to attain in sequence their corresponding piston positions whereby the effective working periods of the respective pistons are of unequal duration, a pair of crank shafts, one for each of said pistons, a chain and sprocket assembly connecting the crank shafts in timed relation, a device operable by the chain for automatically maintaining chain tension and the timing of the crank shafts, and a plurality of engine adjuncts connected to the crank shaft associated with the piston having a shorter working period, said connection being independent of the chain and sprocket assembly.

2. In a Diesel engine, a plurality of engine driven adjuncts, a pair of crank shafts, a pair of pistons, a common cylinder therefor, each piston connected to one crank shaft, a chain and sprocket connection between the crank shafts through which the shafts are maintained in angularly displaced operative relation to each other, a take-up device for the chain, operable by actuation thereof to maintain the operative relation of the shafts, an engine power takeoff extension on the leading crank shaft, and power takeoff means for the engine driven adjuncts associated with the trailing crank shaft.

3. In an internal combustion engine, a plurality of engine driven adjuncts, a pair of crank shafts, a pair of pistons, a cylinder common thereto, each piston being connected to one crank shaft, means connecting the crank shafts in angularly displaced operative relation to each other, a device operable by the connecting means and coacting therewith for maintaining the relation of the shafts irrespective of wear, an engine-power takeoff extension on the leading crank shaft, and power takeoff means for the engine driven adjuncts, associated with the trailing crank shaft.

4. In an engine of two cycle type, a cylinder, two operatively related pistons operable in opposition therein, exhaust ports controlled by one piston, intake ports controlled by the other piston, the exhaust and intake ports being located at different stroke-distances along the paths of the respective pistons, members operatively connecting the pistons, including a flexible, endless drive element, and means coacting with and operable by said element for maintaining the phase relation of the pistons irrespective of expansion and wear of said connecting members.

5. In an engine of two cycle type, a cylinder, two pistons operable in opposed relation therein, exhaust ports controlled by one piston, intake ports controlled by the other piston, the exhaust and intake ports being located at different stroke distances along the respective piston paths, means including a chain and sprocket assembly connecting the pistons to each other for concurrent operation out of phase, and means operable by the chain for maintaining the operative relation of the pistons irrespective of wear of the chain.

6. In a Diesel engine of opposed piston type, a plurality of engine driven adjuncts, a pair of crank shafts, a pair of pistons, a common cylinder therefor, each piston being connected to one crank shaft, a sprocket on each crank shaft, a chain engaging the sprockets for interconnecting the crank shafts in angularly displaced operative relation to each other, means operable by movement of the chain for maintaining at least a minimum chain tension independently of the timed relation of the crank shafts, engine power takeoff means associated with the leading crank shaft, and a power takeoff drive for the engine driven adjuncts, said drive being connected with the trailing crank shaft independently of the sprocket thereon.

7. In an internal combustion engine, a pair of concurrently-working pistons, a pair of crank shafts, each crank shaft connected to one of the paired piston, a sprocket on each crank shaft, a chain engaging and connecting the sprockets, a pair of idler sprockets, engaging opposite passes of the chain, a bracket by which the idler sprockets are carried, a pivot for the bracket, and bracket-holding screw elements for selectively positioning the bracket and idlers about the pivot to adjust the chain tension and adapted to permit such adjustment without affecting the timed relation of the crank shafts.

8. A device for interconnecting two crank shafts of an opposed piston engine, including a sprocket on each crank shaft, a chain engaging the sprockets, a bracket within the chain, idler sprockets carried by the bracket and engaging the sides of the chain, and a mounting for said bracket, the bracket being freely movable upon its mounting, responsively to operation of the chain, and in a direction to bring the idler sprockets into tensioning relation to the chain.

9. In an opposed piston engine, a pair of crank shafts, a chain and sprockets connecting the crank shafts, a bracket and idlers at the ends of the bracket, the bracket and idler assembly exceeding in length the normal distance between passes of the chain and being floatingly disposed therebetween for movement thereby in a chain-tightening direction.

10. In a device for operatively connecting two crank shafts of an opposed piston engine, a sprocket on each crank shaft, a chain engaging the sprockets, a bracket between opposite passes of the chain, a pivot for the bracket, idler sprockets at the opposite ends of the bracket, the bracket, with the sprockets, being of a length appreciably in excess of the normal distance between the opposite passes of the chain, and so disposed as to be brought into chain-tightening relation responsively to operation of the engine.

11. In an engine of opposed piston type, a pair of pistons, a cylinder in which the pistons are operable, two crankshafts, each connected to one of the pistons, a chain through which the crankshafts are maintained in timed relation, chain sprockets on the crankshafts, and a pair of elements engaging opposite passes of the chain in tension-controlling relation, and means for adjustably positioning said elements in directions for increasing and decreasing the deflection of passes of the chain engaged by the elements.

12. In an engine of opposed piston type, a pair of pistons, a cylinder in which the pistons are operable, two crankshafts, each connected to one of the pistons, a chain through which the crankshafts are maintained in timed relation, chain sprockets on the crankshafts, and a pair of elements pivotally mounted for engaging opposite passes of the chain in tension-controlling relation, and means for selectively positioning said elements for increasing and decreasing the deflection of passes of the chain engaged by the elements without affecting the timed relation of the shafts.

13. In a Diesel engine, a plurality of engine driven adjuncts, a pair of crankshafts, a pair of pistons, a common cylinder therefor, each piston connected to one crankshaft, a chain and sprocket connection between the crankshafts through which the shafts are maintained in angularly displaced operative relation to each other, a take-up device for the chain, adapted for maintaining the operative relation of the shafts, an engine power takeoff extension on the leading crankshaft, and power take off means for the engine driven adjuncts associated with the trailing crankshafts.

14. In an engine of two cycle type, a cylinder, two operatively related pistons operable in opposition therein, exhaust ports controlled by one piston, intake ports controlled by the other piston, the exhaust and intake ports being located at different stroke-distances along the paths of the respective pistons, members operatively connecting the pistons, including a flexible, endless drive element, and means coacting with said element and selectively positionable for maintaining the phase relation of the pistons irrespective of expansion and wear of said connecting members.

15. In an engine of two cycle type, a cylinder, two pistons operable in opposed relation therein, exhaust ports controlled by one piston, intake ports controlled by the other piston, the exhaust and intake ports being located at different stroke distances along the respective piston paths, means including a chain and sprocket assembly connecting the pistons to each other for concurrent operation in predetermined angularly displaced relation to each other, and means coacting with the intermediate chain portions, and selectively positionable for taking up stretch and wear of the chain while maintaining the operative relation of the pistons irrespective of wear of the chain.

16. In a Diesel engine of opposed piston type, a plurality of engine driven adjuncts, a pair of crankshafts, a pair of pistons, a common cylinder therefor, each piston being connected to one crankshaft, a sprocket on each crankshaft, a chain engaging the sprockets for interconnecting the crankshafts in predetermined angularly displaced operative relation to each other, means coacting with the chain for insuring at least a minimum chain tension while maintaining the predetermined timed relation of the crankshafts, engine power takeoff means associated with the leading crankshaft, and a power takeoff drive for the engine driven adjuncts, said drive being connected with the trailing crankshaft independently of the sprocket thereon.

HEINRICH SCHNEIDER.
PERCY C. BROOKS.